United States Patent [19]

Somerton-Rayner

[11] Patent Number: 4,629,021
[45] Date of Patent: Dec. 16, 1986

[54] ALL-TERRAIN VEHICLE

[75] Inventor: Michael Somerton-Rayner, Ludgershall, United Kingdom

[73] Assignee: Esarco Limited, United Kingdom

[21] Appl. No.: 696,466

[22] Filed: Jan. 30, 1985

[51] Int. Cl.[4] ............................................. B62D 61/10
[52] U.S. Cl. ........................................ 180/24; 280/797
[58] Field of Search ...................... 180/24, 23, 21, 22; 280/797, 788; 114/270

[56] References Cited

U.S. PATENT DOCUMENTS

| 3,295,623 | 1/1967 | Kyzer | 180/24 |
| 4,274,502 | 6/1981 | Somerton-Rayner | 280/797 |

FOREIGN PATENT DOCUMENTS 188313  12/1966  U.S.S.R. ................. 180/24

Primary Examiner—John A. Pekar
Attorney, Agent, or Firm—Hall, Myers & Rose

[57] ABSTRACT

An all-terrain vehicle has a chassis based on two longitudinal box section members and designed to permit a degree of torsional flexibility, with four beam axles equally spaced along the wheelbase. The drive transmission is arranged so that drive to the wheels on all four axles, or only the center two, can be selected, and the wheels on both the front and rear axles are steerable. The front axle wheels are positively steered whereas the rear axle wheels are arranged to castor to a smaller turning angle than the front wheels. All the wheels are fitted with extra large balloon tires. The axles are of the beam type, with coil suspension springs and swing axle radius rods permitting a considerable amount of vertical movement; limited lateral movement is permitted by Panhard rods.

5 Claims, 3 Drawing Figures

ALL-TERRAIN VEHICLE

This invention relates to all-terrain vehicles and its object is to provide a vehicle that will transport a substantial cargo over rough or soft terrain and can also be driven on roads by means of conventional automobile controls.

According to the invention, an all-terrain vehicle has four roadwheel axles, equally spaced along its wheelbase, with drive transmission means arranged for driving the wheels on all four axles, the wheels on the most forward and the rearmost axles being steerably mounted, all the groundwheels being fitted with extra large ballon tyres.

In the preferred form, the drive transmission means allows selection of drive to the wheels on all four axles or only the central two axles. Preferably also, the axles are mounted on swing axle radius rods and coil suspension springs that allow vertical movement of the axles relatively to the vehicle body.

As a further preferred feature, the chassis, which is of welded construction, has two longitudinal members united by cross members that are positioned only at the front and rear to allow a degree of controlled torsional flexibility.

Figure 1:
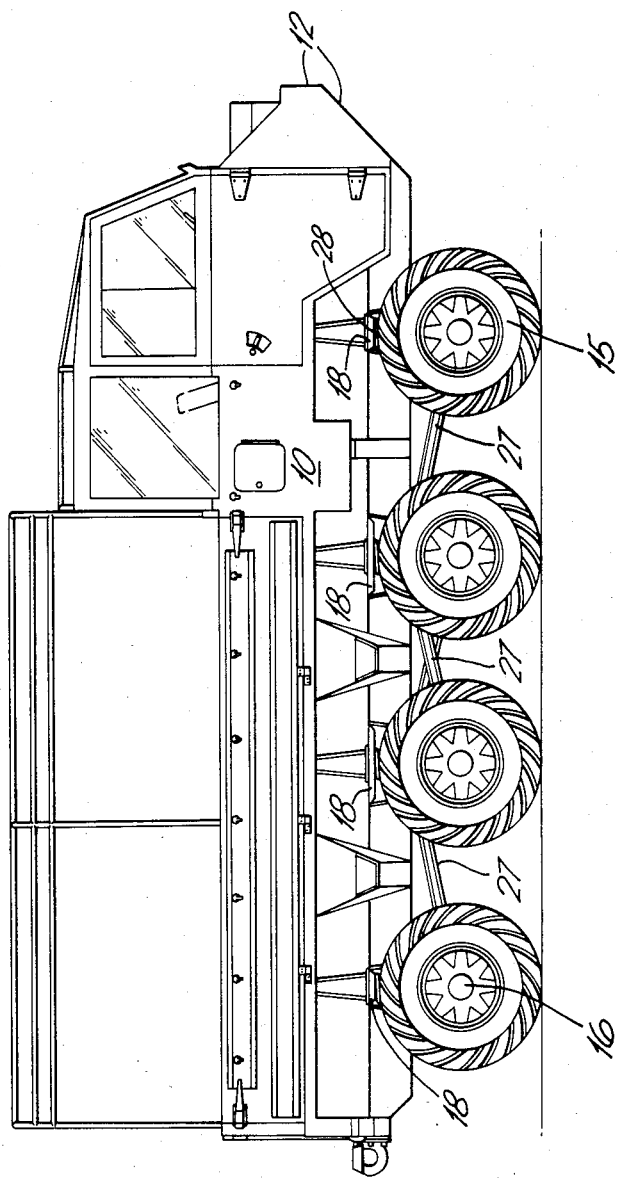
Figure 2:
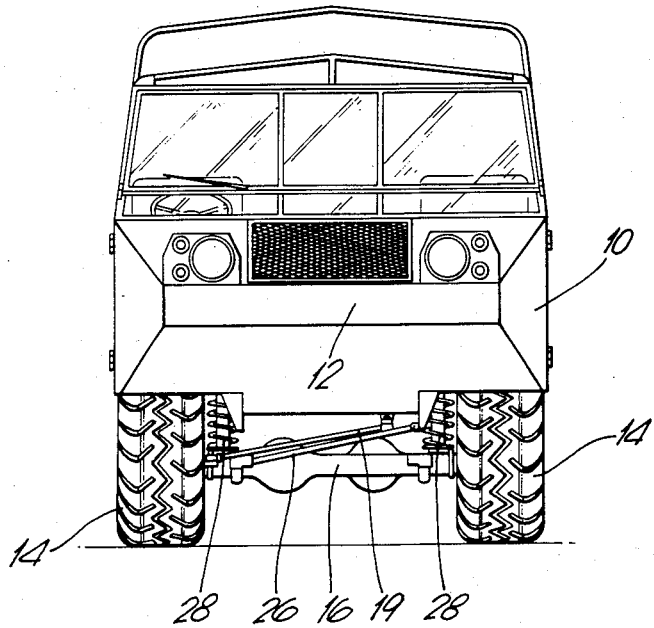
Figure 3:
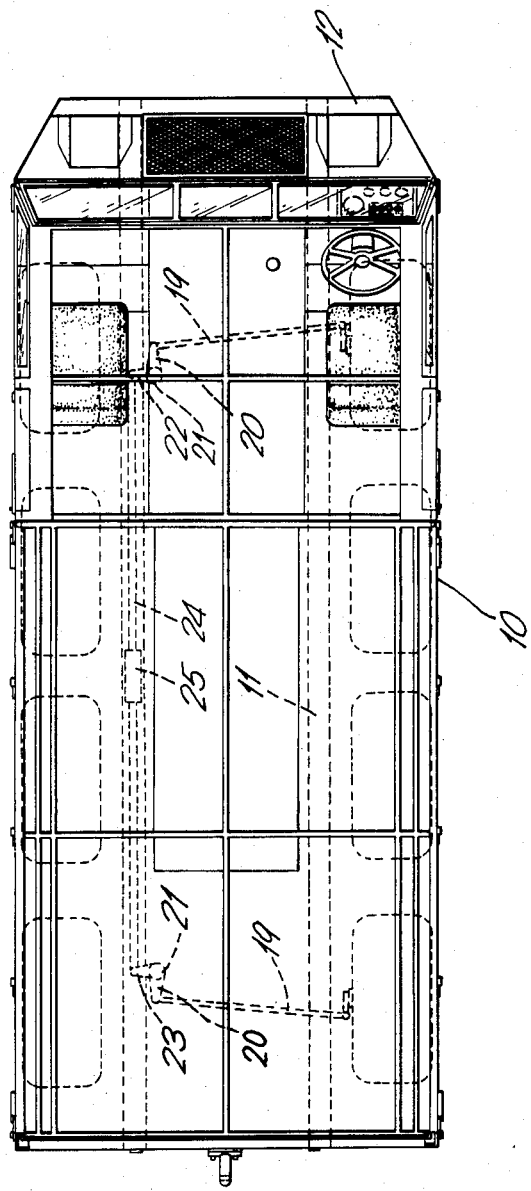

One embodiment of the invention will now be described by way of example, with reference to the accompanying drawings, in which:

FIGS. 1 and 2 are, respectively, side and front elevations of a vehicle embodying the invention, and FIG. 3 is a diagrammatic plan.

The vehicle has a main frame comprising two longitudinally-extending fabricated hollow box sections 11 joined by front and rear cross members that allow a degree of torsional flexibility. Support hangers 18 for the hull or body 10 are welded directly to this main frame and to the hull or body 10 to form a unitary welded structure. The front of the hull structure at 12 is strengthened to allow the vehicle to be driven through a hedge of average European density.

To the bottom of the box members 11 are welded lugs for swing axle radius rods 27 which provide independent vertical movement of the axles 16 on coil springs 28, with a degree of lateral movement permitted by Panhard rods 26. The aim is to permit the use of short propeller shafts for driving the wheels and maintain the shaft universal joints within their permitted angle of operation, while providing sufficient vertical movement to the axle. The swing axles have 9 inches of vertical movement.

The vehicle is powered by a BL Cars 3.5 water-cooled V8 petrol engine as fitted to the Land Rover V8-110, mounted at the forward end of the chassis, after which the drive is taken from a Land Rover gearbox through two Land Rover transfer boxes arranged on a combined support and drive shaft to drive all the road wheel axles. The axles are of the beam type with spiral bevel differential gears and fully floating shafts.

The vehicle has eight wheels 15 with strengthened hubs on the four axles 16, fitted with extra large ballon tyres 14 to give an extremely low ground pressure, and the driving arrangements allow four- or eight-wheel drive to be selected. One of the transfer boxes drives the first and third axles while the other drives the second and fourth axles, thereby allowing all four axles, or only the centre two to be driven. The gaps between the wheel tyres are 4 to 8 inches, giving a ramp brake over-angle of 90°. The ground pressure when fully loaded is not more than 7.8 pounds per square inch.

Both the front and rear axles have conventional knuckle joints for steering. The steering is arranged so that the front axle is steered and the rear axle has a controlled castoring action, together producing a turning circle of 9 feet inner radius. The effective wheelbase of the arrangement is 35 inches, giving this small turning circle. The front wheels are steered by conventional power steering and the castoring of the rear wheels is controlled by front and rear drag rods 19 coupled to respective steering arms 20 of respective steering boxes 21. The steering transmission from the front box 21 to the rear box is from a fixed length relay arm 22 at the front to a further arm 23 at the rear. The arrangement is designed to give a reduced amount of turning angle and a lower rate of angular movement of the rear wheels, in order to avoid any over-steer 'feel' from the castoring rear axle. The arms 22, 23 are connected by a longitudinally-extending link rod 24 which can be disconnected at a coupling 25.

The vehicle is designed to carry a load of 2.0 tonnes over rough terrain and extremely soft ground but additionally can be used on the road. It is fitted with full equipment to comply with this latter requirement and has conventional driving controls needing no special driver training. It can wade to a depth of at least 18 inches, climb gradients up to 45° and has a 40° maximum angle of tilt. All the mechanical parts are Land Rover components of proven reliability.

I claim:

1. An all-terrain vehicle comprising:
    a chassis;
    four road wheel axles equally spaced along the chassis;
    suspension means mounting said axles on said chassis;
    wheels mounted adjacent both ends of each of said axles, the wheels on the foremost and the rearmost axles being steerably mounted;
    propulsion and driving means including a single internal combustion engine and gearbox, and first and second transfer boxes both coupled to be driven by said engine through said gearbox;
    said first transfer box driving the first and third axles and said second transfer box driving the second and fourth axles;
    means for driving in the alternative all four wheels and only the center two wheels;
    power-assisted steering gear means operatively connected to the steerably-mounted wheels of the foremost axle; and
    steering coupling means extending between the steerably-mounted wheels on the foremost and rearmost axles so dimensioned that upon steering of the front wheels, the rear wheels perform castoring constrained to a smaller turning angle and a lower rate of angular movement than the front wheels.

2. A vehicle according to claim 1, having a chassis comprising two longitudinal box section members united by cross members positioned to allow a degree of torsional flexibility.

3. A vehicle according to claim 2, having a hull or body and support hangers therefore welded to the chassis to form an integral unitary structure and having a strengthened front end to enable the vehicle to be driven through hedges.

4. A vehicle according to claim 1, wherein the axles are mounted on swing axle radius rods and coil suspension springs that allow vertical movement of the axles relatively to the vehicle body.

5. A vehicle according to claim 4, wherein the axles are permitted a limited amount of lateral movement controlled by Panhard rods.

* * * * *